United States Patent
Barenys et al.

(10) Patent No.: US 6,745,270 B1
(45) Date of Patent: Jun. 1, 2004

(54) DYNAMICALLY ALLOCATING I²C ADDRESSES USING SELF BUS SWITCHING DEVICE

(75) Inventors: Michael Anton Barenys, Austin, TX (US); Robert Allan Faust, Austin, TX (US); Joel Gerald Goodwin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 09/773,185

(22) Filed: Jan. 31, 2001

(51) Int. Cl.[7] .................................................. G06F 13/00
(52) U.S. Cl. ........................................... 710/104; 710/9
(58) Field of Search .......................... 710/8, 9, 10, 104

(56) References Cited

U.S. PATENT DOCUMENTS

| | | | | |
|---|---|---|---|---|
| 5,636,342 A | * | 6/1997 | Jeffries | 710/9 |
| 5,974,475 A | * | 10/1999 | Day et al. | 710/9 |
| 6,009,479 A | * | 12/1999 | Jeffries | 710/8 |
| 6,240,478 B1 | * | 5/2001 | Brickell | 710/104 |
| 6,389,495 B1 | * | 5/2002 | Larky et al. | 710/8 |
| 6,629,172 B1 | * | 9/2003 | Andersson et al. | 710/104 |

* cited by examiner

Primary Examiner—Glenn A. Auve
(74) Attorney, Agent, or Firm—Duke W. Yee; Mark E. McBurney; Lisa L.B. Yociss

(57) ABSTRACT

A method, apparatus and program for dynamically allocating addresses to computer devices connected to Inter Integrated Circuit (I²C) buses are provided. Upon resetting a I²C bus, the invention uses a bus driver to turn on the first bus switch on the bus. The invention then accesses the first device downstream of the switch and allocates a new value to the device's address. The invention proceeds to turn on the next switch downstream. A new address is then allocated to the device downstream from the second switch. This process continues until all of the devices connected to the bus have unique addresses.

12 Claims, 2 Drawing Sheets

DYNAMICALLY ALLOCATING I²C ADDRESSES USING SELF BUS SWITCHING DEVICE

CROSS REFERENCE TO RELATED APPLICATIONS

The present application is related to U.S. patent application Ser. No. 09/779,368 entitled "A Method for Isolating and I2C bus Fault using Self Bus Switching Device" filed Feb. 8, 2001. The content of the above mentioned commonly assigned, U.S. Patent application is hereby incorporated herein by reference for all purposes.

BACKGROUND OF THE INVENTION

1. Technical Field

The present invention relates to computer bus architecture. More specifically, the present invention relates to Inter Integrated Circuit (I²C) buses.

2. Description of Related Art

Many similarities exist between seemingly unrelated designs in consumer, industrial and telecommunication electronics. Examples of similarities include intelligent control, general-purpose circuits (i.e. LCD drivers, I/O ports, RAM) and application-oriented circuits. The Philips Inter Integrated Circuit (I²C) bus is a bi-directional two-wire serial bus designed to exploit these similarities.

Devices on the I²C bus are accessed by individual addresses, 00–FF (even addresses for Writes, odd addresses for reads). The I²C architecture can be used for a variety of functions. One example is Vital Product Data (VPD). Each component in the system contains a small Electrically Erasable Programmable Read Only Memory (EEPROM) (typically 256 bytes) which contains the VPD information such as serial numbers, part numbers, and EC revision level.

Normally, the device addresses on the I²C bus are predefined by hardwiring on the circuit boards. A limitation of the I²C bus is that it will only allow a single device to respond to each even address between 00 and FF. For this reason, most I²C devices must have a predefined address, which is typically assigned with the use of strapping pins on the device. For example, most I²C accessible EEPROMs have three strapping pins, which limit their addresses to A0–AF (even addresses only). Thus, only 8 devices can be connected to a single bus.

Therefore, a method for increasing the flexibility of the I²C bus system layout, by setting the device addresses in software, would be desirable.

SUMMARY OF THE INVENTION

The present invention provides a method, apparatus and program for dynamically allocating addresses to computer devices connected to Inter Integrated Circuit (I²C) buses. Upon resetting a I²C bus, the invention uses a bus driver to turn on the first bus switch on the bus. The invention then accesses the first device downstream of the switch and allocates a new value to the device's address. The invention proceeds to turn on the next switch downstream. A new address is then allocated to the device downstream from the second switch. This process continues until all of the devices connected to the bus have unique addresses.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
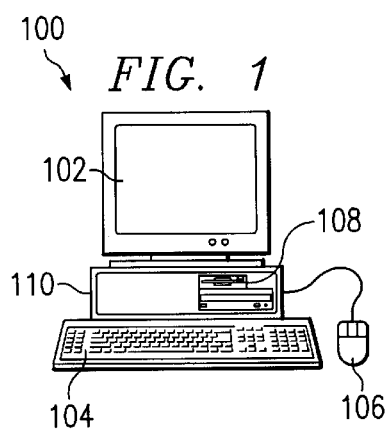
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
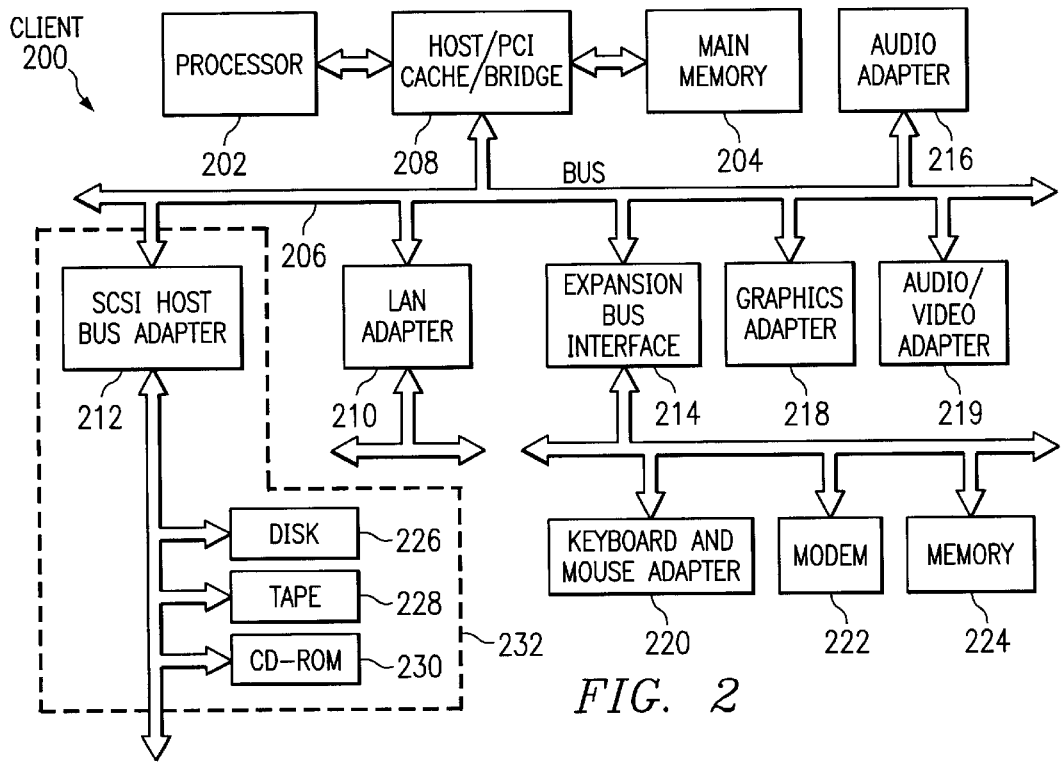
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs an I²C bus architecture. The I²C bus 206 is a bi-directional serial bus requiring only two wires: a serial data line (SDA) and a serial clock line (SCL). Although serial buses do not have the throughput capability of parallel buses, serial buses require less wiring and fewer Integrated Circuit (IC) connector pins. Each device connected to I²C bus 206 is software addressable by a unique address. The devices can operate as either transmitters or receivers. All I²C bus compatible devices have an on-chip interface which allows the devices to communicate directly with each other via the I²C bus 206. A simple master/slave relationship exists at all times. A master is a device which initiates a data transfer and the clock signals to permit the transfer, and any device addressed at the time of transfer is considered a slave. The I²C bus is a multimaster bus, meaning more than one device capable of controlling the bus can be connected to it. However, the present implementation is operated in a single-master mode.

Processor 202 and main memory 204 are connected to I²C local bus 206 through I²C bridge 208. I²C bridge 208 also may include an integrated memory controller and cache memory for processor 202. Additional connections to I²C local bus 206 may be made through direct component interconnection or through add-in boards. In the depicted example, local area network (LAN) adapter 210, small computer system interface SCSI host bus adapter 212, and expansion bus interface 214 are connected to I²C local bus 206 by direct component connection. In contrast, audio adapter 216, graphics adapter 218, and audio/video adapter 219 are connected to I²C local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical I²C local bus implementations will support three or four I²C expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

I²C buses can connect a number of devices simultaneously to the same pair of bus wires. However, a problem results when one of the devices malfunctions and pulls a bus signal (clock or data) low. The I²C bus will not operate in this situation, and it is difficult to determine which device is causing the problem. A similar problem occurs when one of the I²C bus conductors becomes shorted to a low impedance source, such as ground. The solution to these problems is to break the bus into sections in order to determine which section contains the fault. This can be accomplished with the I²C self bus switching device.

The I²C self bus switching device monitors the I²C bus and responds to its own address. The device also passes bus signals through if its switches are turned on. "On" means that the circuit is closed (i.e. the devices downstream from the switch will be connected to the bus and can see the bus traffic). When the switch is "off", the downstream devices are disconnected from the bus. The device can be commanded to turn its switches on or off, and the switches can also be turned off independent of the I²C bus by the switch reset signal. An eight-pin package, for example, permits one address bit to be programmed. This allows switch devices to deal with a bus that has a forked path. A larger pin package can have more address options.

Figure 3:
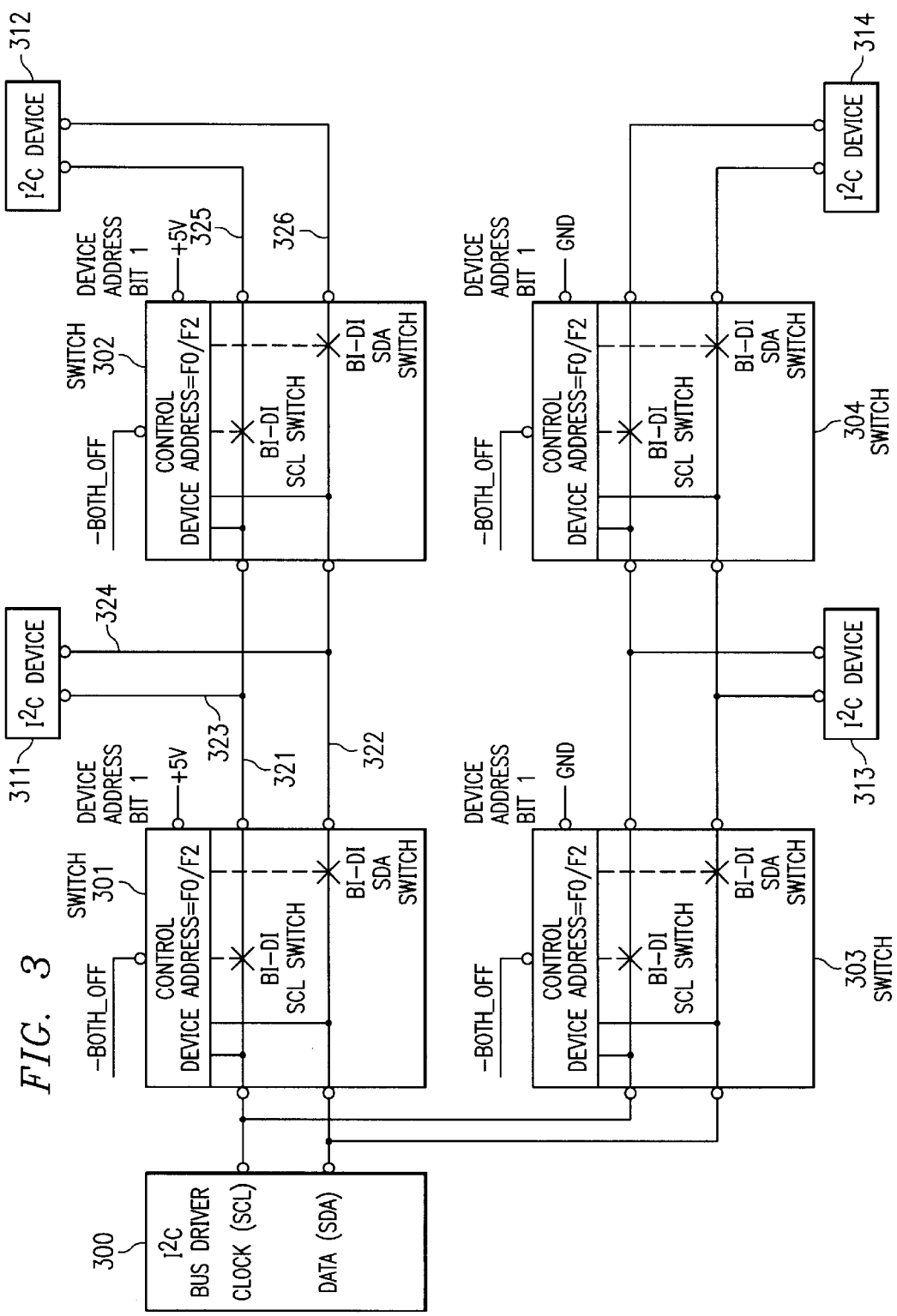
FIG. 3 depicts a schematic diagram illustrating a I²C self bus switching device in accordance with the present invention.

Referring now to FIG. 3, a schematic diagram illustrating an I²C self bus switching device is depicted in accordance with the present invention. The bus driver 300 can communicate with the four main devices 311–314, plus switches 301–304. If a fault occurs on the I²C bus, the system will assert a signal to reset all of the switches 301–304. The bus master will send a bus command on a predefined address to indicate that switch 301 should turn on, and change its address to a new value. Since only switch 301 can see this command (switch 302 is disconnected), switch 301 operates but switch 302 does not. This switch-on command connects the device 311 and switch 302 to the bus. If a fault now exists, it is located in device 311, switch 302, or on the bus connectors 321–324 just switched on.

If no fault exists, the bus master can once again send a command to the predefined address. Both address 301 and 302 will see this command, but switch 301 will not change its state since it is already on respond since its address has been change. Switch 302 will respond to the command, and will then connect device 312 to the bus. If a fault occurs, it is located in device 312 or on the bus connectors 325 and 326. This process is continued with the switches 303 and 304 and devices 313 and 314. In this example, switches 301 and 303 are connected in parallel, but switch 303 has an address bit pulled down, which changes the predefined address of the device.

Figure 4:
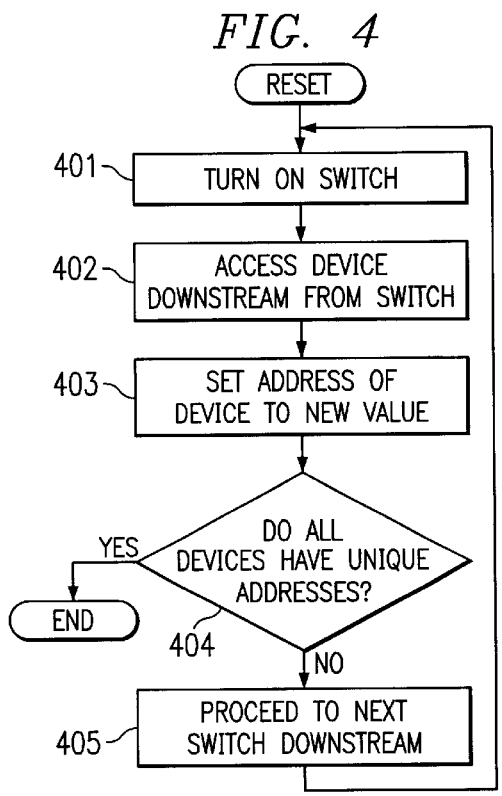
FIG. 4 depicts a flowchart illustrating a method for dynamically allocating I²C addresses, using a I²C self bus switching device, in accordance with the present invention.

Referring to FIG. 4, a flowchart illustrating a method for dynamically allocating I²C addresses, using a I²C self bus switching device, is depicted in accordance with the present invention. This method parallels the fault check described in reference to FIG. 3. The I²C devices 311–314 on the bus may contain the following properties:

1. The address of the device can be changed by accessing a special control register in the device.
2. The default address of the devices are known, and are all the same.
3. The devices are all isolated on their own portion of the bus by bus switches.

At reset, the addresses of the devices 311–314 are reset to an identical default address, and the devices 311–314 are then disconnected from the bus by turning off all of the bus switches 301–304. In order for the master to control the bus switches, they must also respond to commands on the bus. Thus, the switches become specialized devices on the bus. After reset, the bus driver 300 switches on the first portion of the bus by turning on switch 301 (step 401). The driver 300 then accesses device 311 downstream from switch 301 (step 402) and changes the address of device 311 to a new value (step 403). The system then determines if there are any other devices which require unique addresses (step 404). If there are additional devices (as illustrated in FIG. 3), the driver 300 then proceeds to the next switch downstream (step 405) and repeats steps 401–404. Since device 311 now responds to a different address, there will be no addressing conflict with the new device 312. The procedure is repeated until all the devices 311–314 have been given unique addresses.

In the prior art I$^2$C implementation, the device addresses are predetermined by the wiring on the board. Two devices cannot have the same address; both would try to respond to a command from the master. By using the switching device, the parts do not need a set address. In fact, they can all have the same address. For example, if an I$^2$C bus has devices X, Y and Z, unique addresses would normally be assigned to each device (i.e. A0, A2, A4 respectively). However, if bus switches are placed between the devices (i.e. switch XY and switch YZ), then devices X, Y, and Z can all have the same address (i.e. 40).

Starting with switches XY and YZ open, devices Y and Z do not see the traffic on the bus. The master then writes a command to device X telling the device to change its address. Device X will now respond to address A0 instead of address 40. Next, the master will turn on switch XY so that now both device X and device Y can see the traffic on the bus. When the master now writes to address 40, only device Y will respond, since device X has now been changed to respond to address A0. In the same way, the address of device Y is changed to A2, and then switch YZ is then turned on. Now, when the master writes to address 40, only device Z will respond, since X and Y have been assigned new addresses (A0 and A2). The advantage of this is that instead of having to set the device addresses when the board is being wired, the devices can be added at any time to the bus, and they will all initially respond to address 40. After a reset, the master goes through this process of reassigning addresses to all the devices it finds. It can then operate the bus in the normal manner. In addition, as is pointed out in the description of FIG. 3, this mechanism of disconnecting sections of the bus also allows for fault isolation.

The present invention allows a single custom device to use any address from 00 to FF without the need for strapping pins. The addresses of the devices can be changed at any time, which allows for dynamically assigning addresses in hot-plug applications. A designer can assign a new I$^2$C device to a legacy product that may conflict with addresses of the existing devices on a bus. By adding switches and reprogramming the address of the new device, potentially, no programming may be needed on communications with all the previous bus devices.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically allocating addresses to electronic components coupled to a segmented bus, comprising:
    resetting addresses of each of a plurality of devices, coupled to an integrated circuit bus, to a default address;
    controlling, by a bus driver that is coupled to said integrated circuit bus, a position of each one of a plurality of bus switches;
    each one of said plurality of bus switches switching on and off in response to commands received on said bus from said bus driver, said bus driver communicating with all of said plurality of bus switches and controlling a position of each one of said plurality of bus switches regardless of a current position of any of said plurality of bus switches;
    turning off, by said bus driver, said plurality of bus switches and disconnecting all of the plurality of devices from the bus;
    turning on a first bus switch, using said bus driver;
    assigning a first address to a first device connected to the bus downstream of the first bus switch;
    turning on a second bus switch downstream from the first bus switch, using the bus driver; and
    assigning a second address to a second device connected to the bus downstream of the second bus switch, wherein the second address is different from the first address.

2. The method according to claim 1, wherein the integrated circuit bus is an inter integrated circuit bus.

3. The method according to claim 1, wherein the addresses of the devices can be changed by accessing special control registers in the devices.

4. The method according to claim 1, wherein the default addresses of the devices are known and identical.

5. The method according to claim 1, wherein the devices are isolated on their own portions of the bus by the bus switches.

6. The method according to claim 1, further comprising:
    all of said plurality of devices remaining powered on regardless of a position of any of said plurality of bus switches.

7. A system for dynamically allocating addresses to electronic components coupled to a segmented bus, comprising:
    a bus master processor that resets addresses of each of a plurality of devices, coupled to an integrated circuit bus, to a default address;

a bus driver to turn on a first and second ones of a plurality of bus switches;

said bus driver coupled to said integrated circuit bus and for controlling a position of each one of said plurality of bus switches;

each one of said plurality of bus switches switching on and off in response to commands received on said bus from said bus driver, said bus driver communicating with all of said plurality of bus switches and controlling a position of each one of said plurality of bus switches regardless of a current position of any of said plurality of bus switches;

wherein the bus driver assigns a first address to a first device connected to the bus downstream of the first bus switch; and wherein the bus driver assigns a second address to a second device connected to the bus downstream of the second bus switch, wherein the second address is different from the first address.

8. The system according to claim 7, wherein the integrated circuit bus is an inter integrated circuit bus.

9. The system according to claim 7, wherein the addresses of the devices can be changed by accessing special control registers in the devices.

10. The system according to claim 7, wherein the default addresses of the devices are known and identical.

11. The system according to claim 7, wherein the devices are isolated on their own portions of the bus by the bus switches.

12. The system according to claim 7, further comprising:

all of said plurality of devices remaining powered on regardless of a position of any of said plurality of bus switches.

* * * * *